Jan. 5, 1960  R. MATTHEY  2,919,961
SHOCKS CUSHIONING BEARING FOR MEASURING INSTRUMENT
Filed Dec. 17, 1956
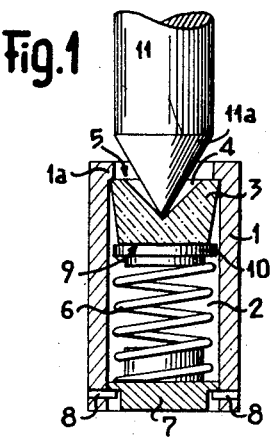
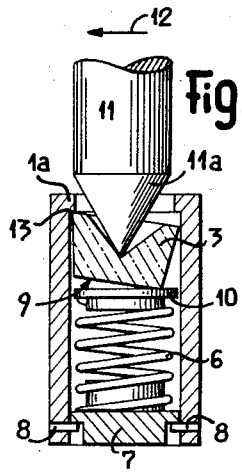
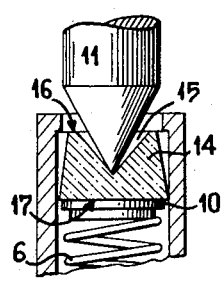
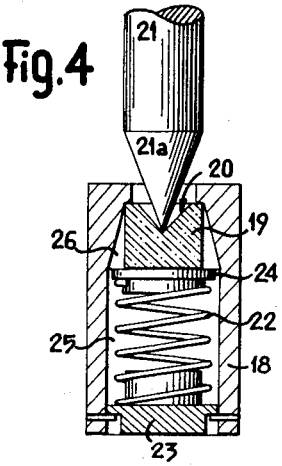
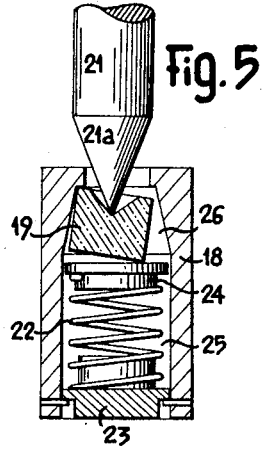
INVENTOR
ROGER MATTHEY
BY Irwin S. Thompson
ATTY.

United States Patent Office 2,919,961
Patented Jan. 5, 1960

2,919,961

SHOCKS CUSHIONING BEARING FOR MEASURING INSTRUMENT

Roger Matthey, Vaud, Switzerland, assignor to Isico S.A., Geneva, Switzerland, a Swiss limited-liability stock company Application December 17, 1956, Serial No. 628,689

Claims priority, application Switzerland December 30, 1955

4 Claims. (Cl. 308—159)

Object of the present invention is a shocks cushioning bearing for measuring instrument. Said bearing is characterized by the fact that it comprises a step bearing foreseen to receive the free extremity of the shaft, located into a cylindrical housing and submitted to the action of an elastic return device and by the fact that said step bearing is mounted in such a manner that it may, on the one hand, slide axially inside said housing and, on the other hand, tilt on itself against the action of said elastic device in order to absorb the axial and radial shocks which said shaft undergoes.

The attached drawing represents by way of example three forms of execution of the object of the invention.

Fig. 1 is an axial cross section of a bearing in rest position.

Fig. 2 is an axial cross section of said bearing at the time of a radial shock on the shaft.

Fig. 3 is a partial axial cross section of the second form of execution.

Fig. 4 is an axial cross section of the third form of execution of the bearing in rest position.

Fig. 5 is an axial cross section of said bearing at the time of a radial shock undergone by the shaft.

The bearing represented comprises a tubular carrier 1 intended to be fastened to the frame of a measuring instrument, for instance. A step bearing 3 is located in an inner cylindrical housing 2 of the carrier 1. Said step bearing is constituted by a stone having the shape of a truncated cone in which is provided a conical recess 4 opening on the great base 5 of said stone. The diameter of said great base 5 corresponds to the boring of the housing 2, so that said step bearing may slide axially inside said housing without appreciable radial play. Besides, thanks to the conical shape of the lateral face of said step bearing, said step bearing may tilt on itself.

A helicoidal spring 6 is provided in order to return said step bearing 3 in its rest position for which said step bearing abuts against an inner shoulder 1a of the carrier 1. Said spring 6 rests, on the one hand, on the carrier 1, by the intermediary of a plug 7 resting on locking pins 8 fastened to said carrier and, on the other hand, on the little base 9 of said step bearing by the intermediary of a washer 10.

The conical extremity 11a of a shaft 11 is engaged in the recess 4 of said step bearing and the extremity of said shaft rests on the bottom of said recess 4. When the shaft 11 undergoes an axial shock, the stone 3 displaces axially, parallely to itself inside said carrier 1, whereby said stone bends lightly said spring 6. When the shaft 11 undergoes a radial shock as it is the case for instance in Fig. 2, where the shaft has been lightly displaced to the left of the figure in the direction of the arrow 12, the stone 3 tilts around a point 13 located on the periphery of its great base 5. Said tilting movement bends lightly the spring 6. The two movements—axial displacement and tilting—may combine when the shaft receives a shock which is at the same time radial and axial. These different shocks are absorbed by the spring 6 which returns each time the step bearing back in its rest position.

The recess 4 having the shape of a cone of the step bearing may present any other shape, for instance ogival, spherical, of trapezoidal section, etc.

Finally, the conicity of the external lateral face of the stone may be more or less accentuated, allowing a tilting movement of the step bearing of a more or less great amplitude.

In the form of execution of Fig. 3, the conicity of the step bearing 14 is inversed with respect to the first form of execution. The recess 15, in which penetrates the extremity of the shaft 11, opens on the little base 16 and the spring 6 acts, by the intermediary of a washer 10, on the great base 17 of the step bearing. Said step bearing may tilt around any point of the periphery of its great base 17.

In the form of execution represented by the Figs. 4 and 5, the bearing comprises a tubular carrier 18 intended to be fastened on the frame of a measuring instrument, for instance. A step bearing 19 is located in an inner housing of the carrier 18. Said step bearing is constituted by a cylindrical stone, in which is provided a conical recess 20 intended to receive the conical extremity 21a of a shaft 21.

The step bearing 19 is submitted to the action of a return spring 22 resting, on the one hand, on the carrier 18 by the intermediary of a plug 23 and, on the other hand, on the step bearing by the intermediary of a washer 24. The inner housing of the carrier 18 comprises a cylindrical part 25 and a part 26 having the shape of a truncated cone. The diameter of the washer 24 corresponds to the boring of the part 25 of the housing, so that said washer, on which rests said step bearing, is guided when it displaces axially, against the action of the spring 22, under the effect of an axial shock when undergoes the shaft 21. Besides, thanks to the annular space provided between the mounting and the step bearing, said step bearing may tilt on itself also against the action of the spring 22, when the shaft 21 undergoes a radial shock as it is the case for instance in Fig. 5, where the shaft has been lightly displaced to the left of the figure in the direction of the arrow 27. During its return movement the step bearing, actuated by the spring 22, cooperates with the wall having the shape of a truncated cone of the part 26 of the housing, in such a manner that its centering is automatically re-established.

The invention is not limited to the described and illustrated forms of execution. Thus for instance, the part 26 of the housing of the mounting 18 may have another shape than that of a truncated cone, and may, for instance, be formed by a spherical cap. Any other shape of the housing, compatible with the necessity to re-establish automatically the centering of the step bearing after its displacements, may also be convenient.

In a variant of execution, the step bearing may be constituted, on the one hand, by a stone presenting a recess made in one of its front faces and foreseen to receive the conical extremity of the pin or the shaft and, on the other hand, a metallic mounting enclosing the stone and in which said stone is mounted, said mounting presenting an external surface having the shape of a truncated cone in the case of Figs. 1 to 3, and an external cylindrical surface in the case of Figs. 4 and 5.

I claim:

1. A shock cushioning bearing for shafts of measuring instruments comprising a step bearing, a housing for said step bearing and an elastic return device acting on said step bearing, said step bearing comprising a front face at the part of the bearing most remote from the elastic device and perpendicular to the axis thereof, said housing comprising a rest face perpendicular to the axis of said housing, said return device tending to maintain said front face of said step bearing against said rest face, said housing comprising inner cylindrical guiding walls, parts of said step bearing sliding along said inner cylindrical guiding walls and said step bearing being free to tilt around a point of the circular periphery of its front face resting on said rest face.

2. A shock-cushioning bearing apparatus for shafts of measuring instruments comprising a hollow housing having an internal wall of circular cross sections, an end wall at one end of said housing, an aperture in said end wall communicating with the interior of said housing and adapted to give passage to a shaft, said end wall forming an annular interior abutting face, a bearing having circular cross sections located in said housing, a conical recess in a front face located at the topmost part of said bearing and adapted to receive the tapered end of a shaft, spring means located in said housing and yieldingly urging said topmost part of the front face of said bearing toward said annular abutting face formed by said end wall and defining a rest position of said bearing, said front face of said bearing having substantially an outer diameter corresponding to the outer diameter of said annular abutting face, whereby said bearing is automatically urged by said spring means into its centered rest position, said wall of said housing and the outer wall of said bearing providing an annular conical tapered clearance therebetween in order to enable said bearing when radially urged by a shaft to rock about a point of the edge of its front face in contact with said end wall and thereupon to be automatically repelled by said spring means in its centered rest position.

3. The apparatus of claim 2 in which said bearing is tapered and said housing is cylindrical, said front face being formed by the larger base of said tapered bearing.

4. The apparatus of claim 2 in which said bearing is cylindrical and said housing comprises a tapered section.

References Cited in the file of this patent

UNITED STATES PATENTS

| 1,843,868 | Copelin | Feb. 2, 1932 |
| 2,372,972 | Morf | Apr. 3, 1945 |
| 2,543,328 | Morf | Feb. 27, 1951 |

FOREIGN PATENTS

| 886,085 | Germany | Aug. 10, 1953 |
| 305,508 | Switzerland | May 2, 1955 |